US007266822B1

(12) United States Patent
Boudnik et al.

(10) Patent No.: US 7,266,822 B1
(45) Date of Patent: Sep. 4, 2007

(54) SYSTEM AND METHOD FOR CONTROLLING AND MANAGING COMPUTER FARMS

(75) Inventors: Konstantin I. Boudnik, Castro Valley, CA (US); Weiqiang Zhang, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 589 days.

(21) Appl. No.: 10/219,718

(22) Filed: Aug. 14, 2002

(51) Int. Cl.
*G06F 9/46* (2006.01)
*G06F 15/16* (2006.01)
*G06F 15/173* (2006.01)

(52) U.S. Cl. .......................... 718/100; 718/1; 718/104; 709/201; 709/202; 709/203; 709/223; 709/224; 709/226; 709/243; 709/245

(58) Field of Classification Search ............ 718/1–108; 719/313–318; 709/221, 201–203, 223–226, 709/243, 245; 707/1, 206
See application file for complete search history.

(56) References Cited

U.S. PATENT DOCUMENTS

| 5,715,373 | A | 2/1998 | Desgrousilliers et al. ..... 385/50 |
| 6,185,611 | B1 * | 2/2001 | Waldo et al. ............... 709/221 |
| 6,381,604 | B1 | 4/2002 | Caughran et al. ............. 707/10 |
| 6,449,648 | B1 * | 9/2002 | Waldo et al. ............... 709/226 |
| 6,499,049 | B2 * | 12/2002 | Waldo et al. ............... 718/104 |
| 6,519,615 | B1 * | 2/2003 | Wollrath et al. ............ 707/206 |
| 6,760,736 | B2 * | 7/2004 | Waldo et al. ............... 707/206 |
| 6,898,618 | B1 * | 5/2005 | Slaughter et al. ........... 709/203 |
| 6,917,976 | B1 * | 7/2005 | Slaughter et al. ........... 709/226 |
| 6,922,685 | B2 * | 7/2005 | Greene et al. ................. 707/1 |
| 2002/0095436 | A1 | 7/2002 | Lee ............................ 707/203 |

OTHER PUBLICATIONS

Jini Specification, "The Jini Architecture Specification", Sun Microsystems Inc., Jan. 1999, pp. 1-12.*
W. Keith Edwards, "Core Jini", The Micro System Press, Jun. 1999, pp. 64-73.*
Ken Arnold, "The Jini architecture: Dynamic Services in a Flexible Network", Sun Microsystem Inc., 1999, pp. 1-6).*
Freeman et al., "Javaspaces Principles, Patterns, and Practice", ISBN 0-201-30955-6, Addison-Wesley, 1999, Chapter 7, pp. 197-215, not Including Cover Pages.*
Burns et al., "An Analytical Study of Opportunistic Lease Renewal", IEEE, 2001, pp. 146-153.*

* cited by examiner

*Primary Examiner*—Meng-Al T. An
*Assistant Examiner*—Jennifer N. To
(74) *Attorney, Agent, or Firm*—Martine Penilla & Gencarella, LLP (57) ABSTRACT

A system and method of controlling a distributed processing system such as a including a first computer that includes a first Java virtual machine and a Java control system that also includes a look-up service. The distributed processing system also includes a second computer that includes a second Java virtual machine and a second Java control system client. The distributed processing system also includes a computer network that couples the first computer and the second computer. The second computer can be configured to register with the look-up service for a first predetermined time period. The second computer registration is examined to determine if the second computer registration will be renewed with the look-up service for a subsequent predetermined time period.

17 Claims, 9 Drawing Sheets

SYSTEM AND METHOD FOR CONTROLLING AND MANAGING COMPUTER FARMS

CROSS REFERENCE TO RELATED APPLICATIONS

The following co-pending U.S. Patent Applications are related to this application Ser. No. 10/224,685, filed Aug. 20, 2002, entitled "SELF CONTAINED TASKS"; and application Ser. No. 10/222,535, filed Aug. 15, 2002, entitled "MULTI-CPUs SUPPORT WITH THREAD PRIORITY CONTROL".

BACKGROUND OF THE INVENTION

1. Field of the Invention

This invention relates generally to distributed software execution, and more particularly to a methods and systems for managing and controlling a multiple server facility.

2. Description of the Related Art

Figure 1:
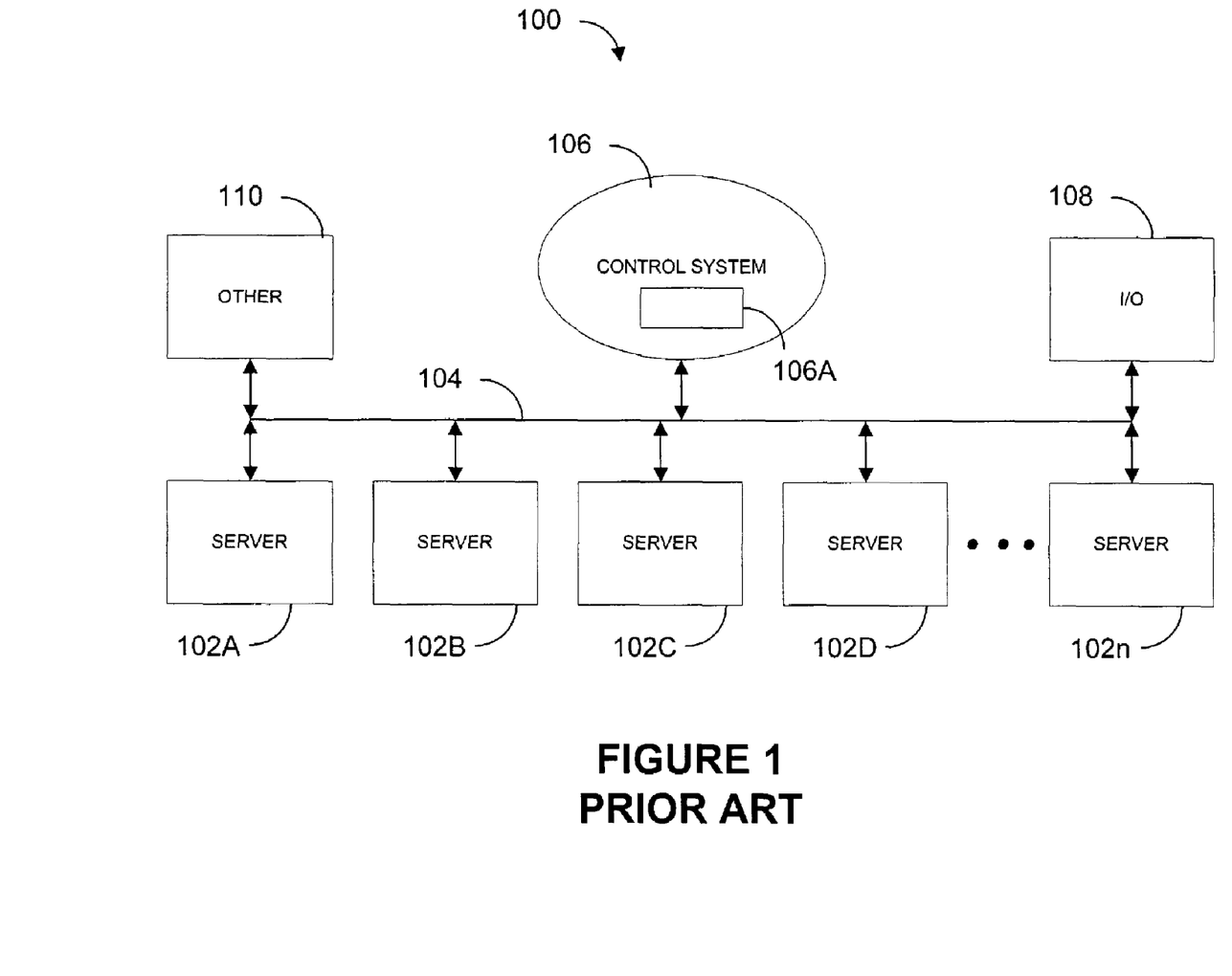
FIG. 1 shows a block diagram of a typical, prior art server farm.

A server farm is a group of networked servers that are housed in one location. A server farm typically streamlines internal processes by distributing the workload between the individual servers and other components of the farm. The server farm can also expedite computing processes by efficiently harnessing the power of the multiple computers (e.g., multiple servers). FIG. 1 shows a block diagram of a typical, prior art server farm 100. The server farm 100 includes multiple servers 102A-n which are networked together by a network 104. The server farm 100 can also include input/output systems 108 for interfacing and networking the server farm 100 to other computers or computer networks (e.g., Internet, LAN, WAN, etc.). The server farm 100 can also include other devices 110 such as may be necessary for the particular demands of the server farm 100.

The server farm is controlled by a control system 106. The control system 106 is typically a separate controlling computer that includes controlling software 106A. The controlling software 106A is typically specifically designed for the precise needs and design of the server farm 100. The controlling software 106A accomplishes such tasks as load balancing, tracking demand for processing power from the different servers 102A-n, prioritizing the tasks input to the server farm 100 and scheduling and rescheduling the tasks depending on priority and demand that users place on the server farm 100. The control system 106 can also automatically replace a failed server (e.g., server 102A) with another server (e.g., server 102B), when the failed server 102A fails.

Combining servers and processing power into a single server farm 100 has been relatively common for many years in research and academic institutions. However server farms are becoming more and more common as companies are utilizing server farms as a way of handling the enormous amount of computerization of tasks and services that the particular company may require.

The typical prior art server farm control system software 106A includes multiple low-level applications that are specifically designed for the specific hardware and software configuration of each of the individual servers 102A-n and the server farm 100. As server farms become more and more common, the specialization and customization of the control system software 106A becomes more problematic. Each implementation of the typical low level, very specifically designed control system software 106A is very complicated. The complications arise due to the individual, specific hardware and software configuration of the server farm 100.

The implementation of the specifically designed control system software 106A is repetitive because many server farms have common requirements. Therefore, customized, low-level control system software 106A is very inefficient and unnecessarily difficult.

What is needed is a simpler and easier-to-implement server farm control system software that also provides the high speed advantages of the prior art low-level applications while also being flexible enough to be deployed on a variety of types of server hardware and software combinations.

SUMMARY OF THE INVENTION

Broadly speaking, the present invention fills these needs by providing JAVA based control software for a distributed processing system such as a server farm or other distributed processing system. It should be appreciated that the present invention can be implemented in numerous ways, including as a process, an apparatus, a system, computer readable media, or a device. Several inventive embodiments of the present invention are described below.

A system and method of controlling a distributed processing system such as a including a first computer that includes a first Java virtual machine and a Java control system that also includes a look-up service. The distributed processing system also includes a second computer that includes a second Java virtual machine and a second Java control system client. The distributed processing system also includes a computer network that couples the first computer and the second computer. The second computer can be configured to register with the look-up service for a first predetermined time period. The second computer registration is examined to determine if the second computer registration will be renewed with the look-up service for a subsequent predetermined time period.

The second computer can also include two or more CPUs and the look-up service can include an attribute for each of the two or more CPUs in the second computer. The attribute for each of the two or more CPUs in the second computer can include a flag identifying if a processing thread for one or more of the of the two or more CPUs is available. The attribute for each of the two or more CPUs in the second computer can also include a status of each of two or more processing threads corresponding to each of the two or more CPUs.

The distributed processing system can also include a third computer. The third computer can include a third Java virtual machine and a third Java control system client. The computer network can also couple the third computer to the first computer and the second computer.

The second computer can be a service consumer and the third computer can be a service provider. A service class includes the service consumer and the service provider. The service class can include a local message queue and a local message dispatcher for handling messages within the service class.

The Java controller can also include a communication module configured to manage communication between the system controller component and the second computer and a task management module configured to manage the executing of a software processing task.

In another embodiment a system and method of controlling a distributed processing system includes providing a first computer. The first computer includes a first Java virtual machine and a Java control system that includes a look-up service. A second computer is also provided that includes a second Java virtual machine and a second Java control system client. A computer network that couples the first computer and the second computer is also provided. The second computer is registered with the look-up service for a first predetermined time period. The registration of the second computer is examined to determine if the registration will be renewed with the look-up service for a subsequent predetermined time period.

If the second computer registration will not be renewed with the look-up service for a subsequent predetermined time period, then the first predetermined time period is allowed to expire.

Alternatively, if the second computer registration will be renewed with the look-up service for a subsequent predetermined time period, then the registration is renewed with the look-up service substantially before expiration of the first predetermined time. The registration renewal can include sending a registration renewal and determining if the registration renewal was successful. If the registration renewal was not successful, then resending the registration renewal until the network is restored. Once the network has been restored, then determining if the first predetermined time has expired. If the first predetermined time has expired then, reregistering the second computer with the look-up service.

The system and method of controlling a distributed processing system can also include providing a third computer that includes a third Java virtual machine and a third Java control system client. The computer network also couples the third computer to the first computer and the second computer. The second computer can be one of several service consumers and the third computer can be one of several service providers. A service class can include at least one service consumer and at least one service provider.

In one embodiment, a task object can be received in a service consumer and a service provider is identified from the several service providers that are registered with the look-up service. The identified service provider is reserved. An envelope message containing the task object is sent from the service consumer to the service provider. The task object is executed in the service provider. A task result can also be output from the service provider to the service consumer.

In one embodiment, executing the task object in the service provider can include receiving a pause task message in the service provider, which causes the service provider to pause the execution of the task. A resume task message can then be received in the service provider causing the service provider to resume execution of the task.

In another embodiment, executing the task object in the service provider can include receiving a restart task message in the service provider causing the service provider to restart the execution of the task.

In one embodiment, the task result is examined to determine if the service consumer received the task result. If the service consumer did not receive the task result, then the task result can be resent until the service consumer receives the task result.

In one embodiment, a message is received in the message queue in the service class a recipient of the message is identified. The message can then be dispatched to the identified recipient. The message can then be examined to determine if the identified recipient successfully received the message. If the identified recipient did not successfully receive the message, then the message can be repeatedly dispatched until the identified recipient successfully receives the message.

In one embodiment, the identified recipient did not successfully receive the message because a network error or outage massage was received. Alternatively, the message could be a synchronous message such that the failure to receive a confirmation of the dispatched message in the local message queue or local message dispatcher determines that the identified recipient successfully received the message.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Several exemplary embodiments of a Java based, server farm control system and software will now be described. It will be apparent to those skilled in the art that the present invention may be practiced without some or all of the specific details set forth herein.

One Java based system for controlling or managing multiple networked computers, such as in a server farm, is known as Jini™ technology (hereinafter "Jini"). Jini can be used to manage and control a dynamic network of computer systems (servers) that can each have different software/hardware configurations. As used herein, a dynamic network is defined as a network in which the computer resources may be part of the network temporarily and for a specific length of time (i.e., spontaneous). In one example, the Jini can provide spontaneous interaction between network components. In this manner, the computer systems can attach to and detach from the dynamic network of computer resources without disturbing the complete network system.

Figure 2:
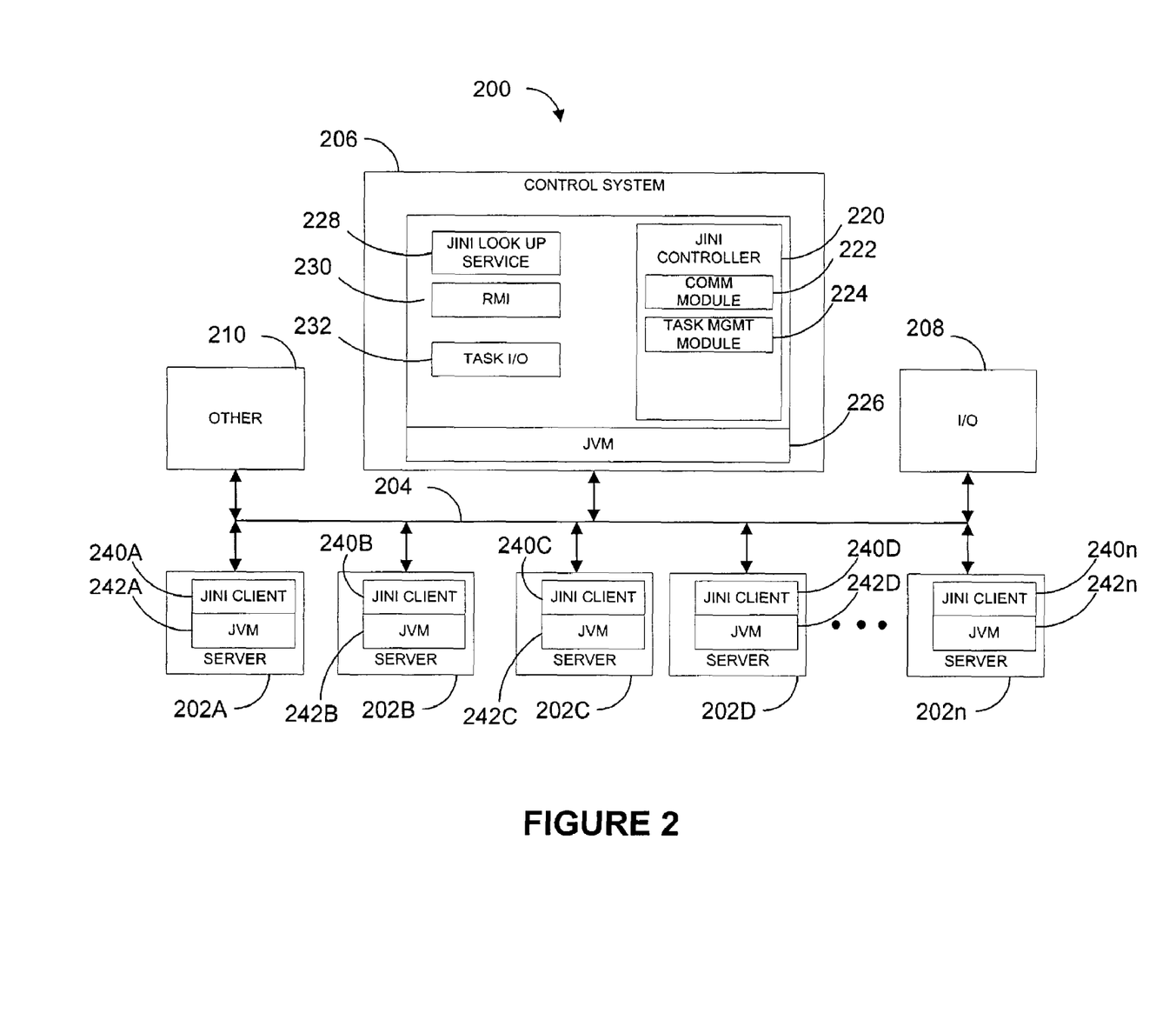
FIG. 2 shows a server farm in accordance with one embodiment of the present invention.

FIG. 2 shows a server farm 200 in accordance with one embodiment of the present invention. The server farm 200 includes a control system 206 that implements the Jini technology to interact with multiple servers 202A-n that are interconnected by a network 204. The control system 206 is configured to include a Jini look up service 228 and a Jini controller 220 configured to manage the processing of the tasks submitted to the server farm 200. The control system 206 can be maintained on one or more computers. In one embodiment each of the multiple servers (i.e. computer resources) 202A-n can "join" the Jini look up service by registering their respective proxies and the corresponding attributes. A communication module 222 is also included and is configured to manage communication between the controller 220 and the other computers 202A-n in the server farm 200. A task management module 228 is configured to manage the execution of one or more software processing tasks within the server farm 200.

In one example, a Jini controller 220 searches the look up service 228 for an available suitable computer resource or resources to process each of the submitted tasks. Each of the multiple servers 202A-n include a corresponding Jini client application 240A-n, respectively. The Jini client applications 240A-n interact with the Jini controller 220 and the Jini look-up service 228.

As one embodiment of the present invention implements the Jini technology, a brief introduction to Jini is provided below. Nevertheless, this brief introduction to Jini should not be considered as limiting as Jini technology is well known by those skilled in the art. Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments such as a server farm 200. Jini simplifies interactions over a network by providing a fast and easy way for clients to use available services. Jini technology is also configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

In one embodiment, a Jini service is configured to employ a proxy to move around the network. As used herein, the proxy is defined as an object having service attributes and communication instructions. Through implementing discovery and join processes, the Jini services are found and thereafter registered with a look up service 228 on a network. As used herein, registering a service is defined as sending the service proxy to all look up services on the network or a selected subset of the look up services. By way of example, the look up service 228 is equivalent to a directory or an index of available services wherein the proxies for each of the services and their associated code are stored. When a service is requested, the proxy associated with the requested service is sent to the requesting client, thus enabling the client to use the requested service. Once dispatched, the proxy can be configured to conduct all communication between the client and the Jini service. As will be described in more detail below, additional methods of communication services can also be included.

In providing an ad-hoc network of computers, in one embodiment, Jini introduces a concept called "leasing." That is, once a service joins the Jini network, the Jini service registers the service's availability for a certain period of leased time. This lease period may be renegotiated (i.e., renewed) before the lease time is expired. When a service leaves the Jini network, the service entry in the look up service 228 is removed automatically once the service's lease is expired. For further details on Jini technology, please refer to K. Arnold et al., The Jini Specification (1999) and W. Keith Edwards, Core Jini (1999).

As Jini is implemented in the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Unfortunately Jini technology does not provide all solutions required to efficiently control the server farm 200. As will be described in more detail below, Jini has numerous shortfalls but does provide a basic foundation upon which at least some of the solutions conceived by the present invention can be implemented.

One shortfall of using Jini technology is that Jini can be very complex to develop Jini applications. Jini application development is complex because an application developer must master many different methods and classes that are required to fully use all of the complex and remote functionality provided by Jini. By way of example, Jini has many hundreds of classes and objects that can be used to perform Jini operations. These hundreds of classes and objects can be difficult for a developer to completely and successfully master. For example, currently approximately 10 kb of code is required to access Jini functions. One embodiment of the present invention provides a simplified system and method for using Jini.

Figure 3:
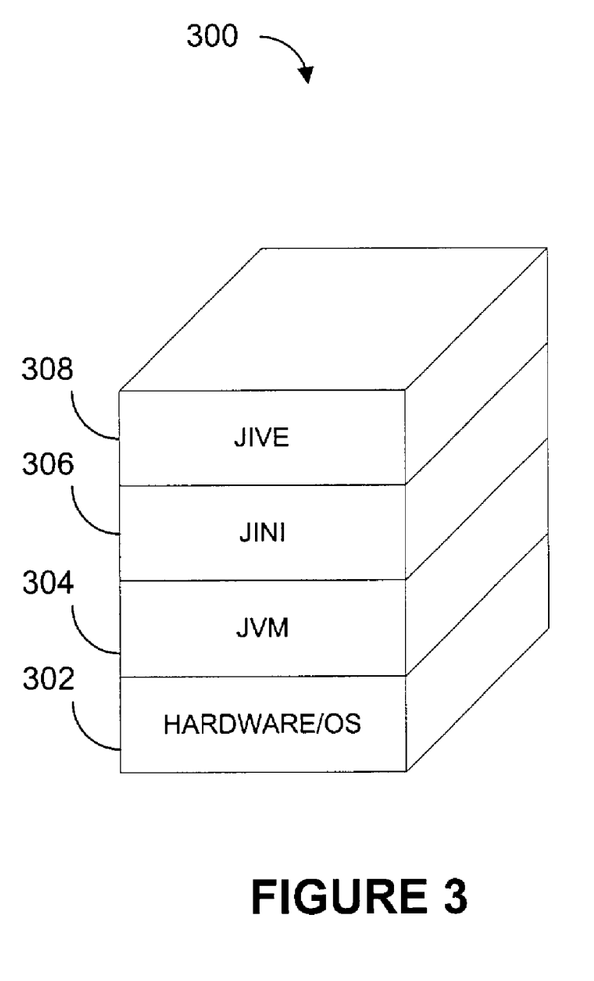
FIG. 3 shows a block diagram of a Jini intercomponent virtual engine (Jive) library layer residing on top of a Jini layer in a Jini development system according to one embodiment of the present invention.

FIG. 3 shows a block diagram of a Jini intercomponent virtual engine (Jive) library layer 308 residing on top of a Jini layer 306 in a Jini development system 300 according to one embodiment of the present invention. The Jive library 308 is shown residing on the Jini layer 306. The Jini layer 306 relies on the Java Virtual Machine (JVM) 304 which as described above, provides the interoperability with the particular hardware 302 layer of the actual computer system.

Unlike Jini, the Jive library 308 has only a few objects and classes that the developer must master to successfully develop a Jini application. The developer can also add additional classes and objects to the Jive library 308 as needed. The developer can also replace classes and objects of the Jive library 308. The Jive library 308 can also be replaced in its entirety, if needed. In comparison to Jini's 10k of code to implement a Jini method, utilizing the Jive library 308 requires only approximately forty lines of code to enable the same Jini functionality. The Jive library 308 can include calls to Jini objects and classes that are simpler for a developer to use. Jive 308 can also insulate and even isolate the developer from directly accessing Jini classes and objects.

The following is an example of a typical Jini self-registration class:

```
public class pureJini {
    public ServiceClass ( ) {
        cat.debug("Calling dispatcher " + dispatcher);
        dispatcher.addListener(this, Message.ALL_MESSAGES);
        defaultAttributes = new HashMap ( );
        msgQueue=new MessageQueue ( );
        Thread msgThread = new Thread( ) {
            public void run ( ) {
                try {
                    messageLoop( );
                } catch (MessageQueueException mqe) {
                /*
                    RuntimeException re =
                        new RuntimeException("Message might not be delivered");
                    re.fillInStackTrace( );
                    throw re;
                */
                }
            }
        };
        msgThread.start( );
        Runtime.getRuntime( ).addShutdownHook (new Thread( ) {
            public void run( ) {
                cleanUp( );
            }
        });
    }
    public ServiceClass (String lus, String name, HashMap attrs) {
        this( );
        defaultAttributes.put("service.type", getType( ));
        defaultAttributes.put("service.name", name );
        lookupServer = lus;
        location = new Address(getTpye( ), name);
        if (attrs != null)
            defaultAttributes.putAll(attrs);
        leaseManager = new SimpleLeaseManager("ServiceClass");
        try {
            register( );
        } catch (RegisterException e) {
            cat.debug(e, e);
            RuntimeException re = new RuntimeException("ServiceClass can't be registered");
            //re.fillInStackTrace( );
            throw re;
        }
    }
    /**
```

```
    * register itself to the JINI lookup server. It will also notify the
    * lease manager so that lease manager can keep it alive on lookup server.
    * @exception RegisterException when there is an error to register itself.
    */
    protected void register ( ) throws RegisterExcpetion {
        try {
            LookupLocator ll = new LookupLocator(lookupServer);
            ServiceRegistrar sr = ll.getRegistrar( );
            rmt = UnicastRemoteObject.exportObject( this );
            item = new ServiceItem (null, rmt, initAttributes( ));
            ServiceRegistration regis =
                        sr.register(item, SimpleLeaseManager.LEASE_TIME);
            if (item.serviceID == null) {
                item.serviceID = regis.getServiceID( );
                cat.debug(item.serviceID);
            }
            SimpleLeaseManager.RegisterInterface ri;
            final ServiceRegistrar fsr = sr;
            ri = new SimpleLeaseManager.RegisterInterface ( ) {
                public Object reregister( ){
                    try {
                        return fsr.register(item,
                                SimpleLeaseManager.LEASE_TIME);
                    } catch (Exception e) {
                        return null;
                    }
                }
            };
            leaseManager.renewLeaseFor (sr, regis, ri);
        } catch (Exception e ) {
            cat.debug(e, e);
                RegisterException re = new RegisterException("Service Component couldn't
register with LookupService");
                //re.fillInStackTrace( );
            throw re;
        }
    }
    public static void main (String [ ]args){
PropertyConfigurator.configure(System.getProperties( ).getProperty("log4j.configuration"));
        String lus;
        if (args.length==0)
            lus = "jini://myjinihost";
        else lus = args[0];
        if (!lus.startsWith("jini:")) lus = "jini://"+lus;
        System.setSecurityManager(new RMISecurityManager( ));
        ServiceClass sc = new ServiceClass(lus, "test");
    }
}
```

As can be seen from above, the Jini self-registration class is quite lengthy at over 100 lines of code in length. The Jini self-registration class is also complex and provides numerous opportunities for error and requiring extensive program development effort and expertise to create accurately.

For comparison purposes there follows exemplary Jive class for illustrating one embodiment of the present invention. This exemplary Jive class uses several Jive primitives to wrap Jini self-registration calls and provides the same functionality as the above typical Jini self-registration class.

```
public class Agent extends pureJini {
    public static synchronized Agent getInstance (String lus,
                                String name,
                                HashMap attrs) {
        if (self ==null)
            self = new Agent(lus, name, attrs);
        return self;
    {
```

```
// Attributes management has been removed from here.
HashMap attrs = new HashMap( );
public static void main (String [ ]args) {
    String lus = new String( );
        HashMap commands = cmdLineParser(args);
    if (args.length >= 1)
            lus = args[0];
        if (!lus.startsWith("jini://"))
            lus = "jini://"+lus;
        System.setSecurityManager(new RMISecurityManager( ));
        try {
            Agent sc = Agent.getInstance(lus, "at "+
java.net.InetAddress .getLocalHost( ).getHostName( ),
                        attrs);
        } catch(Exception e) {
            cat.error(e);
                cat.debug(e, e);
                System.exit(1);
        }
    }
}
```

In comparison, the Jive class has only 35 lines of code versus over 100 lines of code for the Jini class providing the same functionality.

Also as described above, Jini technology is most appropriately used in a network were different computers on the network perform various coordinated tasks. This capability is very important in managing and controlling server farms. However, remote methods are dependent on network stability in that a network outage or even a very short duration network interruption can cause the remote method to fail. By way of example, the conventional Jini lease system can be unstable as described as follows. Each computing service (e.g., a particular server or service provider or service consumer) within the network is registered with Jini. The Jini registration is based on leases as described above. If a service is registered with Jini and the lease has a lease duration of five minutes, then the service must renew the lease before the lease expires (i.e., within the five minutes of the lease). If Jini does not receive the lease renewal within the five minute lease duration, then Jini will list the service as unavailable.

Leases may not be renewed due to a temporary network outage. If the network connection between the Jini lookup service and the service is temporarily interrupted just when the service sends the lease renewal, then the lease renewal will not be received within the duration of the lease. The lease renewal is typically an asynchronous message to Jini from the service so therefore the service in unaware that the renewal was not received. Due to the network interruption, Jini does not receive the lease renewal and the lease will expire, thereby requiring the service to reregister with the Jini look-up service 228. Further, the service will not reregister (i.e., start a new lease) until several minutes pass, therefore it is very likely that the service may not be available for an extended time as a result of a minor, temporary network interruption.

Figure 4:
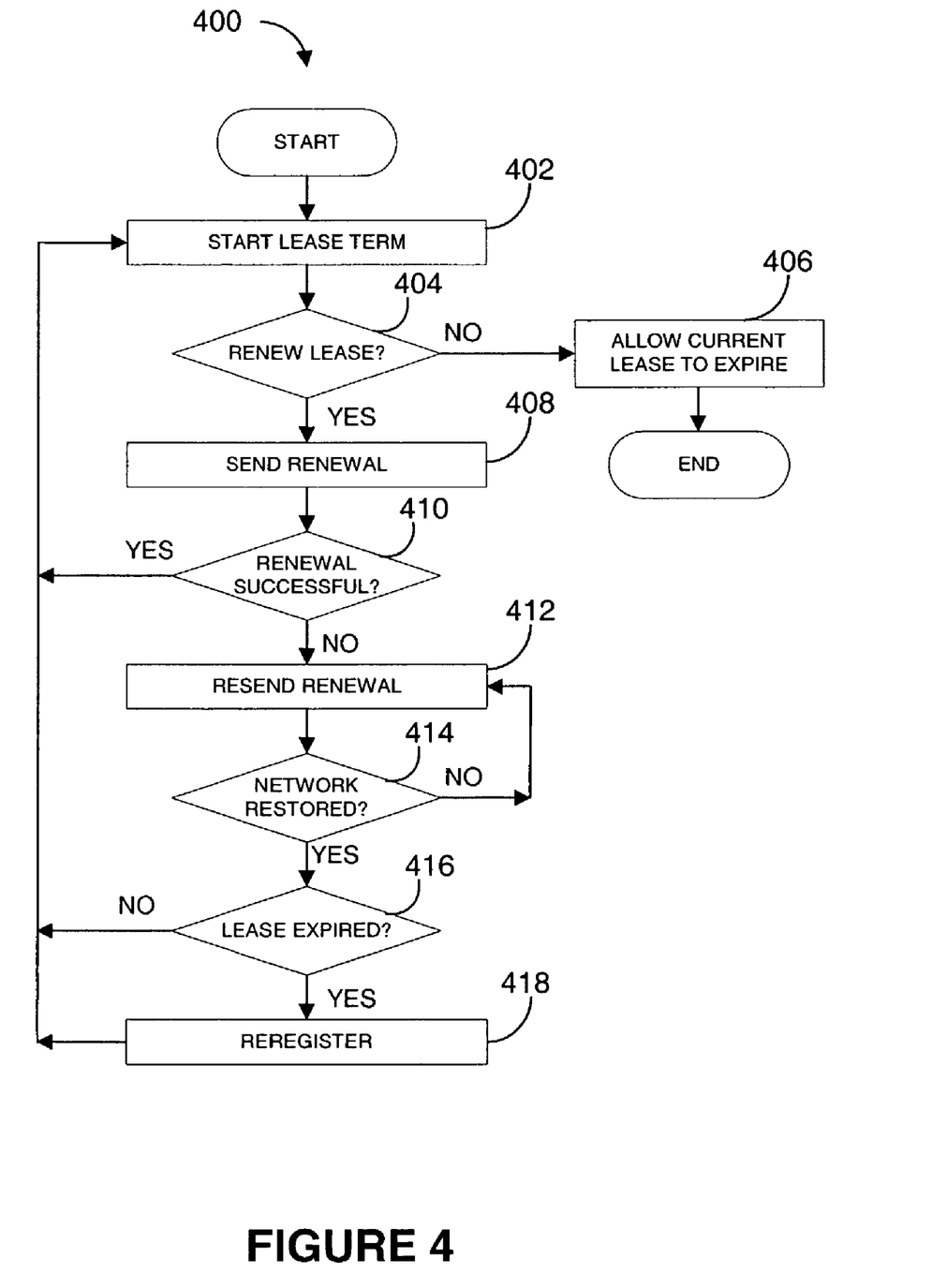
FIG. 4 shows the method operations of an improved more reliable lease system according to one embodiment of the present invention.

FIG. 4 shows the method operations 400 of an improved more reliable lease system according to one embodiment of the present invention. In operation 402, the lease term begins by an initial registration of the service with Jini. In operation 404, the lease is examined to determine if the service will renew the lease or not. The lease may be renewed or not depending upon the demands and priorities on the service. In one embodiment, rather than sending the lease renewal message one time, near the end of lease duration, the lease renewal can be sent well before the expiration of the lease term so that the service can receive some form of confirmation that the lease renewal was successful before the lease term expires, as will be described below.

If, in operation 404, it is desired to not renew the lease, then the lease is allowed to expire at the end of the lease simply by not sending a renewal in operation 406 and the method operations end. Alternatively, if, in operation 404, it is desired to renew the lease, then, in operation 408, a lease renewal is sent.

In operation 410, the renewal is examined to determine if the renewal was successful. In one embodiment, the lease renewal can be confirmed as being renewed by a reply message from the Jini look-up service 228 or the Jini controller 220 that the lease has been renewed. However requiring a lease renewal response from Jini can further load the server farm 200 and thereby reduce the efficiency of the server farm 200. Therefore, the lease renewal message can remain asynchronous but also include a period to wait for a possible notice of a network outage. A notice of a network outage can be in the form of an error message (e.g., an exception is thrown if renewal message does not get through the network to the Jini look-up service). If a notice of an error message is received by the leased service, then the leased service will know that the network connection to the Jini has been interrupted and the renewal did not get through to the Jini. If in operation 410, the renewal was successful, then the lease term is restarted and the method operations repeat beginning in operation 402, as described above.

If the lease renewal is not successful in operation 410, then the renewal is resent in operation 412 until the network connection to Jini is restored in operation 414. In one embodiment, the network connection is restored when a confirmation of the renewal is received or alternatively, when a network error message is no longer received in response to the renewal being sent.

However, if the lease expired during the network outage, then Jini will reply with an error message such as a "no current lease to renew" message to the (now previously) leased service. If a "no current lease to renew" message is received in operation 416, then the service can immediately initiate a reregister with Jini in operation 418 and the method operations repeat beginning in operation 402, as described above.

The multiple lease renewals can begin well before the lease term expires. In one instance, if the lease duration were five minutes then under a conventional Jini lease, the renewal would be sent at approximately the five-minute time. In one embodiment, under the improved Jini lease system, the lease renewal is sent at approximately three minutes into the five minute lease, thereby allowing sufficient time for any potential temporary network interruption to be corrected and a renewal to be resent as described above, all before the initial lease term expires. Of course one skilled in the art can see how the lease renewal can be sent at any time during the lease renewal that would provide sufficient time with the lease term to receive a network outage and/or error message. Alternatively, if the network interruption extends beyond the lease term, then the service will also be notified of exactly when the network connection has been restored and that the service must immediately reregister with Jini, thereby minimizing the time that the service is identified as "unavailable" in the Jini look-up service 228.

Figure 5:
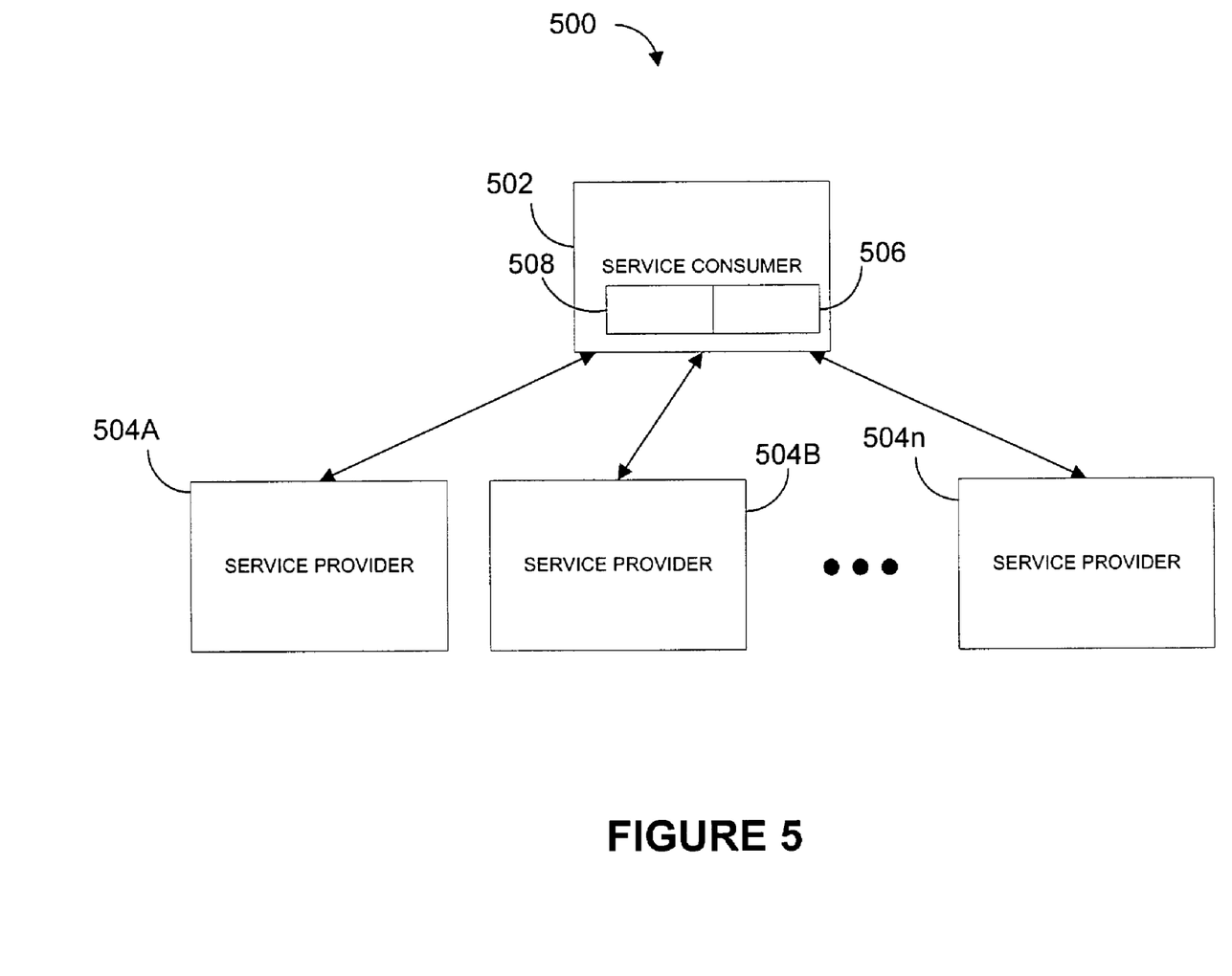
FIG. 5 shows a block diagram of a network of multiple computing resources.

FIG. 5 shows a block diagram of a network 500 of multiple computing resources 502, 504A-n. A first computing resource is a service consumer 502 in that it requires one or more service providers (such as service providers 504A-n) to perform a service. By way of example, the service consumer 502 can be a control system such as control system 206 in FIG. 2 above, that is dispatching tasks to be preformed by various computing resources such as servers 202A-n (e.g., service providers 504A-n). Alternatively, the service consumer 502 can be any computer that is using any of the other computing resources 202A-n, 210, 208, 206 of the server farm 200, as service providers 504A-n, to perform tasks for the service consumer 502.

Figure 6:
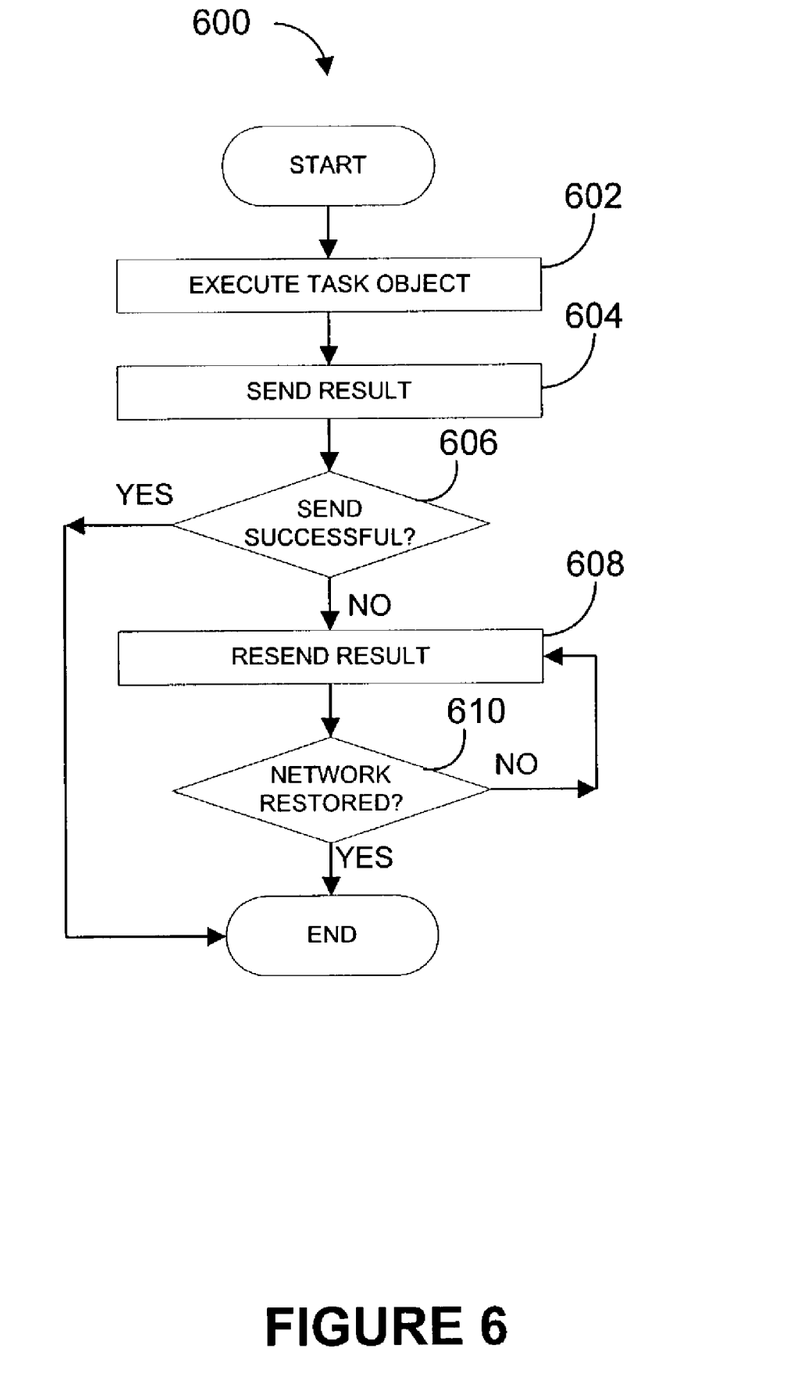
FIG. 6 shows the method operations of a service provider outputting an executed task object result according to one embodiment of the present invention.

As described above, the network outage messages (e.g., exceptions thrown) can also notify a leased service that other messages sent across the network were not successfully delivered due to network interruptions. FIG. 6 shows the method operations 600 of a service provider outputting an executed task object result according to one embodiment of the present invention. In operation 602, a service provider 504A has completed execution of a task object and a result is produced. The task object also includes outputting the result. In operation 604, the result is output. If the service provider 504A sends the completed result in operation 604 and receives a network outage message or other message indicating the result did not successfully get through the network in operation 606, then the service provider 504A can retain the result. The retained result can then be sent repetitively in operations 608 and 610, until the network outage messages such as described in operations 412, 414 of FIG. 4 above, are no longer received or another response as described herein is received by the service provider 504A, from the service consumer 502. Once the result is successfully sent in operation 610, the method operations end.

As described in FIG. 6, the task result is not lost due to the network outage and the service provider 504A can complete the task object regardless of the network connection status. Thereby, the result is preserved and the task object is not required to be repeated.

Yet another shortfall of Jini is that the conventional Jini message system is not sufficiently reliable enough to efficiently manage and control a server farm 200. One embodiment of the present invention provides an improved, more reliable message system. A local message queue or system can be included within each service class. Referring again to FIG. 5, if a service provider 504B sends a message, the message is sent to a local message queue 506. Similarly, when a message for one of the service providers 504A-n is received in the local message queue 506, a local message dispatcher 508 delivers the message to the service provider (or providers) that may be interested in receiving the message or type of message.

In one instance, a service provider 504B within a selected service class 500 is a message counter. Therefore all messages sent to any service providers 504A-n within the service class 500 would be sent to the message counter in service provider 504B in addition to the particular service provider (e.g., service provider 504A) or providers that the message is specifically directed to.

The local message queue 506 allows messages between service provider(s) and/or the service consumer(s) within the service class 500 to be routed locally. In addition, the local message queue 506 allows a message from within the service class 500, that is directed to a recipient that is outside of the service class 500 (e.g., an output result from a service provider) to be delivered as described in FIG. 6 above.

Still another shortfall of Jini is that the task exchange mechanism is typically formatted according to the specific requirements of the application and can even be service provider specific. One embodiment of the present invention provides a universal task exchange system. The universal task exchange system includes multiple universal task messages including: a reserve service provider message, an envelope message, a run task message, a pause task message, a resume task message, a restart task message, a stop task message, a task completed message, and an unreserve message.

A reserve service provider message is a message sent by a service consumer 502 to a service provider (e.g., service provider 504A) to reserve or lock-up service provider 504A so that other service consumers cannot also use the service provider 504A and thereby interfere with the execution of the task object(s) the service consumer 502 will send to the service provider 504A. The reserve message can be synchronous or asynchronous. A synchronous reserve message provides a confirmation that the service provider 504A is reserved for the use of the service consumer 502 such as executing task objects for the service consumer 502.

An envelope message is a message the service consumer 502 can use to enclose the current task object for transfer to the service provider 504A. The run task message instructs the computing resource (i.e., a service provider 504A) to execute the current task object. The stop message instructs the computing resource to cease and abort execution of the current task object. The pause task message instructs the computing resource to pause execution of the current task object at the then current stage of execution but does not abort execution of the current task object. The resume task message instructs the computing resource to unpause execution of the current task object (i.e., continue execution of the current task object at the stage of execution where paused by a previous pause task message).

The restart task message instructs the computing resource to stop execution of the current task object and begin the execution at the beginning of the current task object. The service provider 504A can send a task completed message when the execution of the current task object is completed. An unreserve message can be sent by the service consumer 502 to the service provider 504A, in response to the task completed message. The unreserve message can be synchronous or asynchronous.

Figure 7:
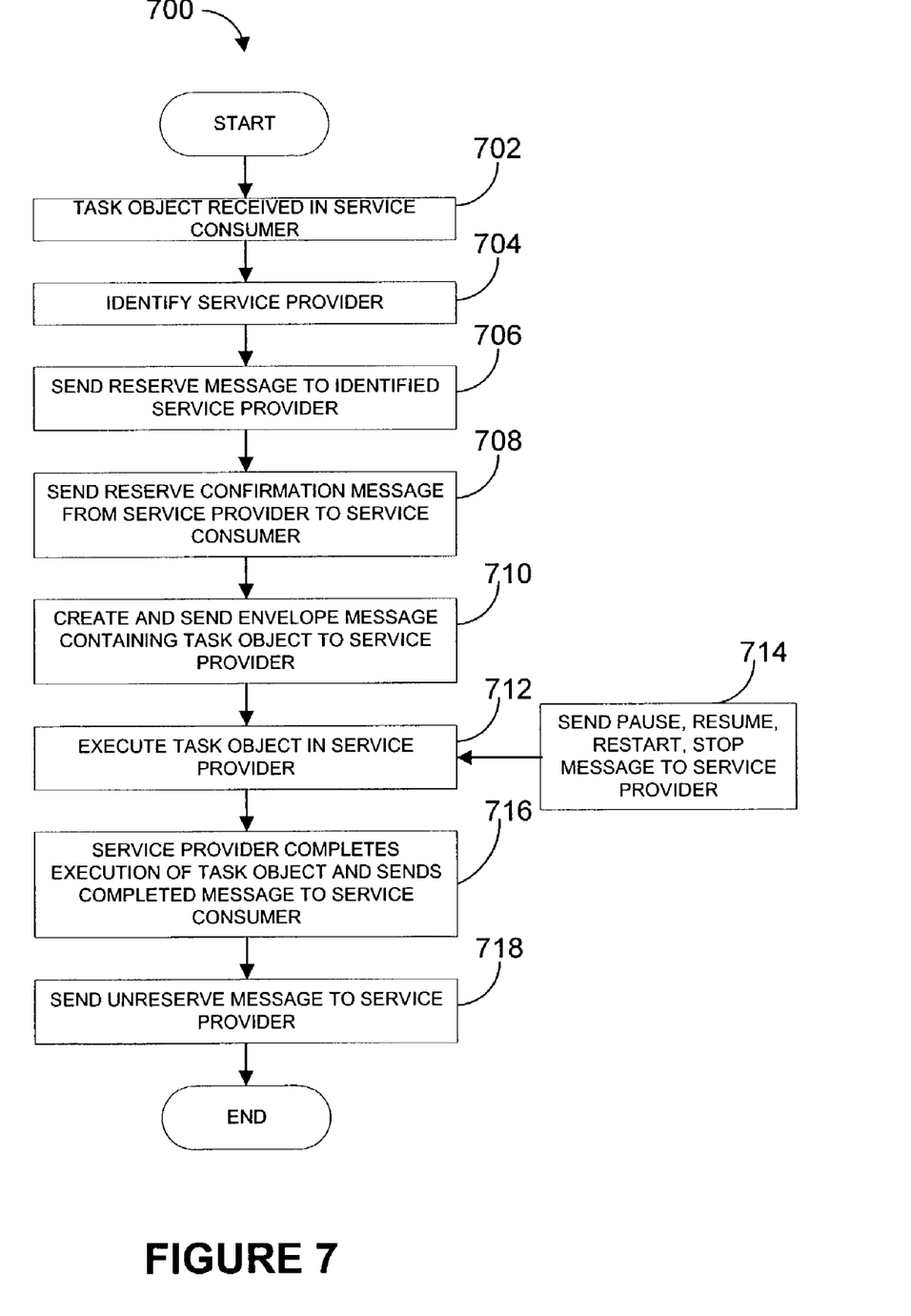
FIG. 7 illustrates an exemplary method operations of the exchange of several universal messages between a service consumer and a service provider according to one embodiment of the present invention.

FIG. 7 illustrates an exemplary method operations 700 of the exchange of several universal messages between a service consumer 502 and a service provider 504A according to one embodiment of the present invention. In operation 702, a task object is submitted to the service consumer 502 from some other source. The task object can be submitted to the service consumer 502 by a source within the service class 500 or outside the service class 500.

In operation 704, the service consumer 502 identifies an appropriate service provider (i.e., service provider 504A) using the Jini look-up service 228. Once the appropriate service provider 504A is identified, the service consumer 502 sends a reserve message to the service provider 504A in operation 706.

The service provider 504A can respond to the synchronous reserve message to confirm availability of the service provider 502, in operation 708. Alternatively, if the reserve message is not a synchronous reserve message, then operation 708 can be bypassed.

In operation 710, the service consumer 502 creates and sends an envelope message that includes the task object within the body of the message. In operation 712, the service provider 504A receives the envelope message and extracts the task object.

In operation 712, the service provider 504A initiates the task object and executes the task object. In operation 714, during execution of the task object, the service consumer 502 can pause, resume, restart and stop the execution of the task object using the corresponding messages described above.

In operation 716, the service provider 504A completes execution of the task object and sends a task completed message to the service consumer 502 when execution of the task object is completed. The service consumer 502 can also send an unreserve message the service provider 504A, in operation 718. The unreserve message can release the service provider 504A for another service consumer's use. The unreserve message can be synchronous or asynchronous.

As described above in FIG. 5, a service class 500 can include a local message queue 506 and a local message dispatcher 508. The local message queue 506 can receive and hold messages that are exchanged among the service providers 504A-n and the service consumers 502 within the service class 500. The local message queue can also receive and hold messages that originate from within the service class 500 but are addressed to a recipient that is outside the service class (e.g., in a different service class or the controller, or any other recipient outside the service class 500).

The local message queue 506 can also receive and hold messages that originate from outside the service class 500 but are addressed to one of the service providers 504A-n and service consumers 502 within the service class 500. The local message queue 506 and local message dispatcher 508 allow the service class to manage messages within the service class 500, thereby providing a more robust messaging system.

Figure 8:
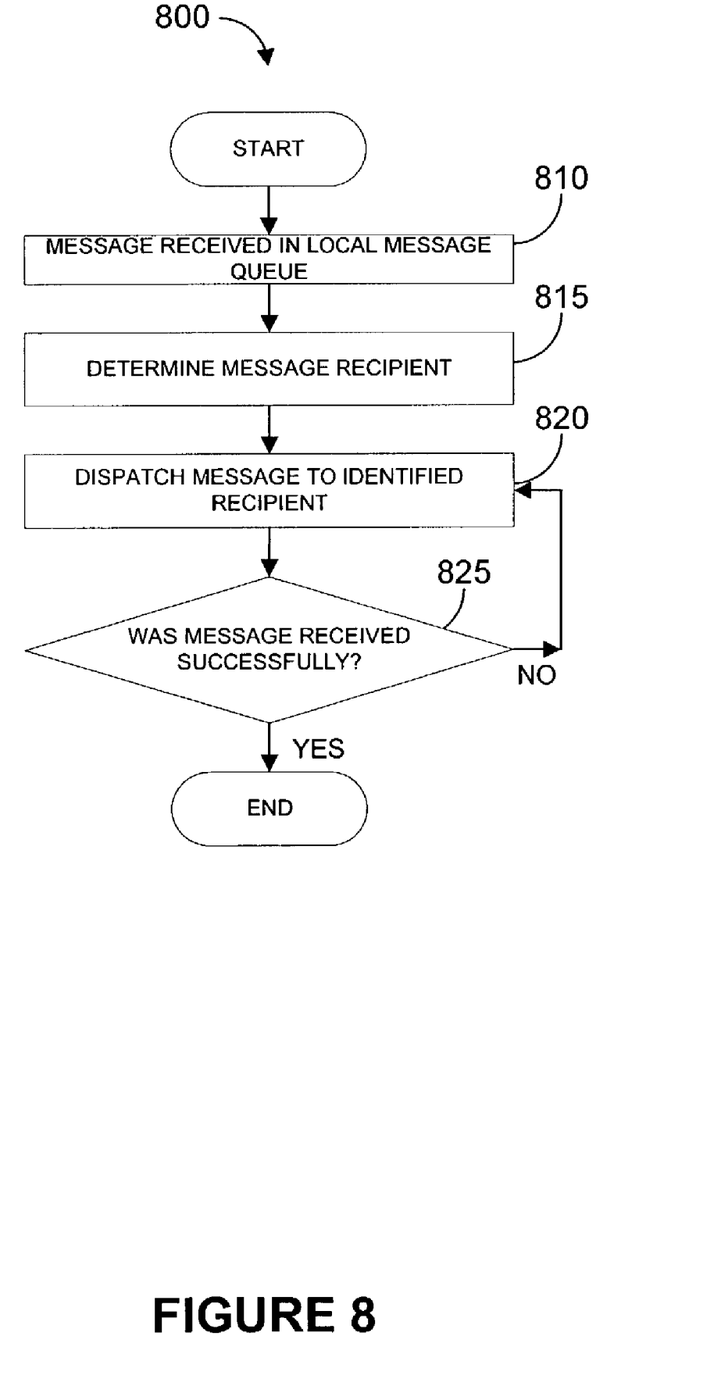
FIG. 8 shows method operations of the operations of the local message queue and local message dispatcher according to one embodiment of the present invention.

FIG. 8 shows method operations 800 of the operations of the local message queue 506 and local message dispatcher 508 according to one embodiment of the present invention. In operation 810, a message is received in the message queue 506 such as described above. In operation 815 the message is examined to identify the recipient of the message. The message recipient could be a service provider 504A-n or service consumer 502 within the service class 500 or some other intended recipient (addressee) outside the service class 500. In operation 820 the message is dispatched to the identified recipient.

In operation 825, the message is examined to determine if the identified recipient successfully received the message. As described above in FIG. 6, an error message or a network outage message could indicate that the dispatched message was not successfully received. If in operation 825, the message was not successfully received, then, the message is again dispatched to the intended recipient until the identified recipient and the method operations end successfully receive the message.

As described the messages dispatched from the local message queue 506 are not lost in the case of a network outage and are temporarily retained within the local message queue 506 after being sent so that if an error message is received, the dispatched message can be resent.

Figure 9:
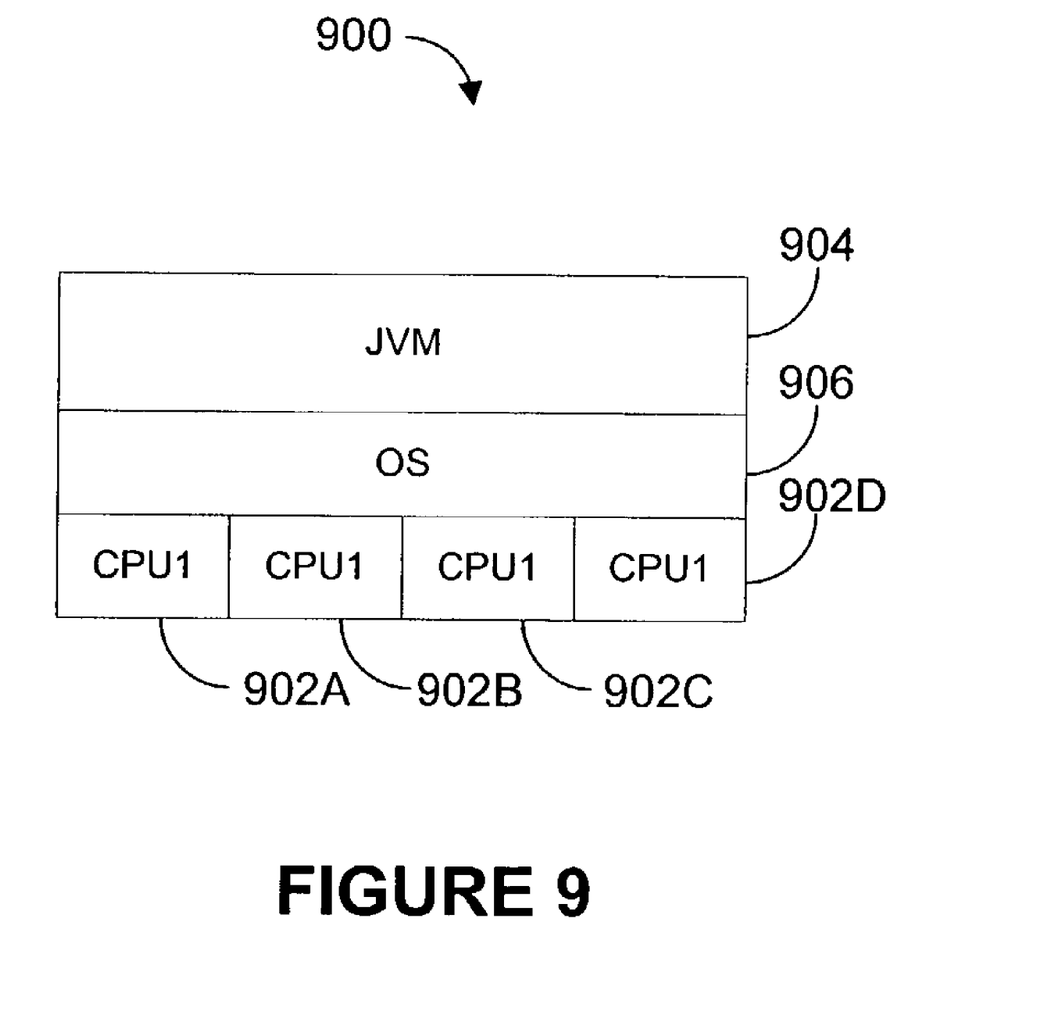
FIG. 9 shows a representation of a multiple CPU computer in accordance with one embodiment of the present invention.

Jini also does not provide any way to directly access or control each CPU within a multiple CPU computer. Multiple CPU computers are very common in server farms and it is also often desirable for the server farm controller to be able to directly access tasks and task loading on each CPU within the multiple CPU computer. FIG. 9 shows a representation of a multiple CPU computer 900 in accordance with one embodiment of the present invention. The multiple CPU computer 900 includes four CPUs 902A-D, and a JVM 904 residing on the operating system 906. The JVM 904 can maintain a separate processing thread for each of the four CPUs 902A-D.

Conventional Jini registration does not include a capability of identifying the availability of and therefore managing or coordinating the use of each of the multiple processing threads within the multiple CPU computer 900. In one embodiment the Jini registration is improved to include attributes or status of each of the multiple processing threads within the multiple CPU computer 900. By way of example, a "thread available" flag is set to "true" until all of the multiple processing threads within the multiple CPU computer 900 have been assigned to tasks.

In addition, the status of each processing thread can be specifically identified. In one embodiment, a number of "free threads" and a number of "busy threads" can be included in the attributes of the multiple CPU computer 900. When the number of "busy threads" is equal to the total number of processing threads in the multiple CPU computer 900, then the "thread available" flag is set to "false". In one instance if three processing threads in the multiple CPU computer 900 are allocated to a first task, a second task and a third task, respectively, then the number "free threads" is set to "1" and the number of "busy threads" is set to "3".

Further, the "thread available" flag is set to "true". When a fourth processing thread in the multiple CPU computer 900 is then allocated to a fourth task, then the number "free threads" is set to "0" and the number of "busy threads" is set to "4", and the "thread available" flag is set to "false".

Although the above description includes a four CPU multiple CPU computer system 900, it should be understood that the multiple CPU computer system 900 could include more or less than four CPUs.

Although the present invention mainly describes exemplary embodiments of a distributed computer system, such as a server farm, that are designed to execute a tasks and task objects, it must be understood by one having ordinary skill in the art that the distributed computer system of the present invention can be implemented to run any computer process.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIGS. 4, 6 and 7 are not required to be performed in the order illustrated, and that all the processing represented by the operations may not be necessary to practice the invention. Further, the processes described in FIGS. 4, 6 and 7 can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A distributed processing system comprising:
    a first computer including:
        a first Java virtual machine; and
        a Java control system including a look-up service;
    a second computer including:
        a second Java virtual machine; and
        a second Java control system client; and
    a computer network that couples the first computer and the second computer, the second computer being configured to register with the look-up service for a predetermined time without receiving a renew request from the look-up service and to renew the registration with the look-up service before expiration of the predetermined time, wherein renewing the registration includes receiving a confirmation of the renewed registration, wherein the confirmation of the renewed registration is received from the look-up service and wherein the confirmation of the renewed registration is received in the second computer, wherein the second computer includes two or more CPUs and wherein the look-up service includes an attribute for each of the two or more CPUs in the second computer, wherein the attribute for each of the two or more CPUs in the second computer includes a flag identifying if a processing thread for one or more of the two or more CPUs is available.

2. The distributed processing system of claim 1, wherein the attribute for each of the two or more CPUs in the second computer includes a status of each of two or more processing threads corresponding to each of the two or more CPUs.

3. The distributed processing system of claim 1, further comprising:
    a third computer including:
        a third Java virtual machine; and
        a third Java control system client;
        wherein the computer network further couples the third computer to the first computer and the second computer.

4. The distributed processing system of claim 3, wherein the second computer is a service consumer, and the third computer is a service provider; and wherein the service consumer and the service provider comprise a service class.

5. The distributed processing system of claim 4, wherein the service class includes a local message queue and a local message dispatcher.

6. A distributed processing system of claim 1, further comprising a Java controller including:
    a communication module configured to manage communication between system controller component and the second computer; and
    a task management module configured to manage the executing of a software processing task.

7. A method of controlling a distributed processing system comprising:
    providing a first computer including:
        a first Java virtual machine; and
        a Java control system including a look-up service;
    providing a second computer including:
        a second Java virtual machine; and
        a second Java control system client;
    providing a computer network that couples the first computer and the second computer;
    registering the second computer with the look-up service for a first predetermined time period; and
    determining if the second computer registration will be renewed with the look-up service for a subsequent predetermined time period, wherein if the second computer registration will be renewed with the look-up service for a subsequent predetermined time period, then renewing the registration with the look-up service substantially before expiration of the first predetermined time without receiving a renew request from the look-up service including:
        sending a registration renewal; and
        determining if the registration renewal was successful including receiving a confirmation of the registration renewal, wherein if the registration renewal was not successful, then resending the registration renewal until the registration renewal is received from the look-up service and wherein the confirmation of the renewed registration is received in the second computer, wherein the second computer includes two or more CPUs and wherein the look-up service includes an attribute for each of the two or more CPUs in the second computer, wherein the attribute for each of the two or more CPUs in the second computer includes a flag identifying if a processing thread for one or more of the two or more CPUs is available.

8. The method of claim 7, further comprising:
    if the second computer registration will not be renewed with the look-up service for a subsequent predetermined time period, then allowing the first predetermined time period to expire.

9. The method of claim 7, wherein, if the registration renewal was not successful, then determining if the network has been interrupted and once the network has been restored, then determining if the first predetermined time has expired, if the first predetermined time has expired then, reregistering the second computer with the look-up service.

10. The method of claim 7, further comprising:
    providing a third computer including:
        a third Java virtual machine; and
        a third Java control system client, wherein the computer network couples the third computer to the first computer and the second computer and wherein the second computer is one of a plurality of service consumers and the third computer is one of a plurality of service providers and wherein a service class includes at least one service consumer and at least one service provider.

11. The method of claim 10, further comprising:
    receiving a task object in a service consumer;
    identifying a service provider from the plurality of service providers that are registered with the look-up service;
    reserving the identified service provider;
    sending an envelope message containing the task object from the service consumer to the service provider;
    executing the task object in the service provider; and
    outputting a task result from the service provider to the service consumer.

12. The method of claim 11, wherein executing the task object in the service provider includes:
    receiving a pause task message in the service provider;
    pausing the execution of the task;
    receiving a resume task message in the service provider; and
    resuming execution of the task.

13. The method of claim 11, wherein executing the task object in the service provider includes:
   receiving a restart task message in the service provider; and
   restarting the execution of the task.

14. The method of claim 11, further comprising:
   determining if the task result was received by the service consumer;
   if the task result was not received by the service consumer, then resend the task result until the task result is received by the service consumer.

15. The method of claim 10, further comprising:
   receiving a message in a message queue in the service class;
   identifying a recipient of the message;
   dispatching the message to the identified recipient;
   determining if the message was successfully received by the identified recipient;
   if the message was not successfully received by the identified recipient, then again dispatching the message until the message is successfully received by the identified recipient.

16. The method of claim 15 wherein the message is an asynchronous message.

17. The method of claim 15 wherein the message is a synchronous message.

* * * * *